(12) United States Patent
Rosenbauer

(10) Patent No.: US 9,534,330 B2
(45) Date of Patent: Jan. 3, 2017

(54) HOUSEHOLD APPLIANCE

(75) Inventor: Michael Georg Rosenbauer, Reimlingen (DE)

(73) Assignee: BSH Hausgeräte, Munich (DE)

( * ) Notice: Subject to any disclaimer, the term of this patent is extended or adjusted under 35 U.S.C. 154(b) by 1293 days.

(21) Appl. No.: 13/214,267

(22) Filed: Aug. 22, 2011

(65) Prior Publication Data
US 2012/0053752 A1    Mar. 1, 2012

(30) Foreign Application Priority Data

Aug. 26, 2010  (DE) ........................ 10 2010 039 834

(51) Int. Cl.
| | | |
|---|---|---|
| *D06F 33/02* | (2006.01) | |
| *A47L 15/00* | (2006.01) | |
| *A47L 15/42* | (2006.01) | |
| *D06F 39/00* | (2006.01) | |
| *H04L 12/28* | (2006.01) | |

(52) U.S. Cl.
CPC ........... *D06F 33/02* (2013.01); *A47L 15/0021* (2013.01); *A47L 15/4293* (2013.01); *D06F 39/005* (2013.01); *H04L 12/282* (2013.01); *A47L 15/0063* (2013.01); *A47L 2401/34* (2013.01); *A47L 2501/28* (2013.01); *D06F 2210/00* (2013.01); *H04L 2012/285* (2013.01)

(58) Field of Classification Search
CPC ...... Y04S 20/224; Y04S 20/242; Y04S 50/12; H02J 3/14; H02J 2003/143; H02J 2003/146; Y02B 70/3266; G06Q 30/04; G06Q 50/06; G01D 4/00; A47L 15/46
USPC ....................................................... 700/297
See application file for complete search history.

(56) References Cited

U.S. PATENT DOCUMENTS

| | | | | |
|---|---|---|---|---|
| 6,181,985 B1 * | 1/2001 | O'Donnell | ................ | H02J 3/14 700/291 |
| 7,561,977 B2 * | 7/2009 | Horst | ........................ | H02J 3/14 700/295 |
| 8,307,229 B2 * | 11/2012 | Lee | ........................ | G01R 22/10 702/60 |
| 8,538,595 B2 * | 9/2013 | Lyren | ........................ | H02J 3/14 340/538 |
| 8,565,928 B2 * | 10/2013 | Venkatakrishnan | ... | G06Q 10/06 700/285 |
| 8,593,292 B2 * | 11/2013 | Tsujimura | .............. | G01D 4/002 340/635 |
| 8,615,332 B2 * | 12/2013 | Heilman et al. | ............. | 700/295 |
| 8,884,472 B2 * | 11/2014 | Rosenbauer | ............ | A47L 15/46 307/140 |
| 2002/0128853 A1 * | 9/2002 | Kikuchi | ................. | G06Q 30/06 705/307 |

(Continued)

OTHER PUBLICATIONS

National Search Report EP 11 17 7349 dated Jun. 30, 2016.

*Primary Examiner* — Crystal J Barnes-Bullock
(74) *Attorney, Agent, or Firm* — Michael E. Tschupp; Andre Pallapies

(57) ABSTRACT

A household appliance, in particular a water-conducting household appliance, which can be connected to a power supply network of an energy supplier, includes a communication and/or control facility. A bidirectional signal connection connects the communication and/or control facility to the energy supplier for exchange and/or request information, in particular network electricity information relating to electricity tariffs of the energy supplier.

20 Claims, 3 Drawing Sheets

(56) References Cited

U.S. PATENT DOCUMENTS

| | | | |
|---|---|---|---|
| 2003/0036820 A1* | 2/2003 | Yellepeddy | G05B 15/02 700/291 |
| 2004/0243524 A1* | 12/2004 | Crichlow | 705/412 |
| 2007/0139186 A1* | 6/2007 | Hertel et al. | 340/538.12 |
| 2008/0043617 A1* | 2/2008 | Schekochikhin et al. | 370/229 |
| 2008/0049616 A1* | 2/2008 | Kamath et al. | 370/235 |
| 2008/0049786 A1* | 2/2008 | Ram et al. | 370/468 |
| 2008/0122585 A1* | 5/2008 | Castaldo et al. | 340/286.01 |
| 2008/0272934 A1* | 11/2008 | Wang et al. | 340/870.11 |
| 2009/0100132 A1* | 4/2009 | Ebrom et al. | 709/203 |
| 2009/0240656 A1* | 9/2009 | Tanabe et al. | 707/3 |
| 2010/0106641 A1* | 4/2010 | Chassin et al. | 705/40 |
| 2010/0187219 A1* | 7/2010 | Besore et al. | 219/494 |
| 2010/0328097 A1* | 12/2010 | Leo | G01D 15/00 340/870.02 |
| 2011/0046799 A1* | 2/2011 | Imes et al. | 700/286 |
| 2011/0276289 A1* | 11/2011 | Park | G01R 21/133 702/62 |
| 2012/0072033 A1* | 3/2012 | Imes et al. | 700/278 |

* cited by examiner

HOUSEHOLD APPLIANCE

BACKGROUND OF THE INVENTION

The invention relates to a household appliance, in particular a water-conducting household appliance, which can be connected to a power supply network of an energy supplier, and is fitted with a communication and/or control facility.

Energy supply companies can offer different electricity tariffs in their energy supply networks. These differ inter alia in respect of electricity price, availability period and in respect of the manner of electricity generation. One standard tariff is for example the night electricity tariff, which is known per se and with which the price of electricity is more favourable at night.

To this end power suppliers output ripple control signals by way of the power supply network, containing for example information about the start and end times of the night electricity tariff. It is possible to actuate household appliances automatically based on such ripple control signals, thereby utilising the more favourable night electricity tariff.

BRIEF SUMMARY OF THE INVENTION

It is an object of the invention to provide a household appliance, in particular a water-conducting household appliance, with which the consumption costs of the household appliance can be further optimised.

According to the characterising portion of claim 1 the communication and/or control facility can be connected in a bidirectional signal connection to the energy supplier. This means that information can be exchanged and/or requested in both signal directions between the communication and/or control facility of the household appliance and the energy supplier. Such information includes in particular network electricity information relating for example to electricity tariffs of the energy supplier or the like. It is therefore not only possible on the one hand for tariff information to be transmitted from the energy supplier to the household appliance but the control device of the household appliance can also request information from the energy supplier, for example the time period for specific tariffs, for example the night electricity tariff, and/or the start time of specific tariffs, or alternative electricity tariffs. The communication and/or control facility of the household appliance can determine a start time and/or a wash program type based on such information. The communication and/or control facility here can be a part disposed in the interior of the household appliance. It is however also possible, particularly if the communication and/or control facility is configured as two separate parts, to dispose the communication facility outside the household appliance, e.g. in a holding shaft with corresponding electrical connection options, while the control facility, which is used in particular to actuate appliance components of the household appliance, is disposed in the interior of the household appliance.

For example a program selection can be performed by the communication and/or control facility based on the tariff information from the energy supplier so that an energy-intensive wash program or a wash program of longer program duration is set particularly when the night electricity tariff is available. Alternatively the communication and/or control facility can display different start times and/or different wash program types based on the electricity tariff information provided and the user can select a start time and/or wash program type from these.

The bidirectional signal connection can in particular be wireless or by way of power supply lines.

For simple operation the electronic communication and/or control facility of the household appliance can feature an electricity tariff selection facility. The user can use such a selection facility to select an electricity tariff from the electricity tariffs offered by the energy supplier, using the communication and/or control facility to adjust household appliance operation as a function of the selected electricity tariff.

Appliance operation can be matched to the selected electricity tariff both in respect of time and also in respect of further process parameters. The primary aim here may be to reduce consumption costs of the household appliance. Alternatively and/or additionally a specific electricity tariff can be selected in a user-friendly manner as desired by the customer to satisfy any of the user's criteria, for example an electricity tariff, for which only electricity from renewable energy sources is offered during the time it is available.

The electricity tariff selection made using the electricity tariff selection facility here can be made again for any operating cycle of the household appliance. Alternatively the selection facility can be used to preset an electricity tariff selected by the user permanently.

As set out above, the communication and/or control facility can match the timing of household appliance operation to the respectively selected electricity tariff. To this end the communication and/or control facility can either extend or reduce the operating period as a function of the selected electricity tariff, in order for example to reduce energy costs within the period of availability of the selected electricity tariff.

Alternatively the communication and/or control facility can be used to delay the start of operation until a time when power is supplied at the selected electricity tariff. Appliance operation is then enabled fully automatically; in other words the user does not have to predefine a time interval that would have to be input manually into a timer clock.

The communication and/or control facility can feature a timer element, which is used to delay the start of operation by a delay time predefined by the communication and/or control facility. At the end of the delay time, appliance operation is started automatically in the period in which the selected electricity tariff is available.

The electricity tariff selection facility can have a display unit to display electricity tariff information from the energy supplier, so that the user can have a simple overview of the range of electricity tariffs. The electricity tariff information can display for example the period of availability during which the respective electricity tariff is offered, the manner of electricity generation during this time period and the electricity price.

The electricity tariff information can be stored manually by the user in the electricity tariff selection facility. The electricity tariff information then has to be updated by the user in each instance or input correctly into the household appliance. Alternatively the electricity tariff selection facility can receive the electricity tariff information by way of data lines. It is particularly preferable if the electricity tariff information can be transmitted by way of ripple control signals directly from the power supply network of the energy supplier to the electricity tariff selection facility of the household appliance.

To this end ripple control systems of the energy supplier can also be used inter alia, to transmit the electricity tariff information to the household appliance. To this end a ripple control signal receiver can be assigned to the household appliance, allowing the ripple control signals to be transmitted from the power supply network to the electricity tariff selection facility. In this way the electricity tariff information in the electricity tariff selection facility of the household appliance is continuously updated without the user having to do this actively. Additionally a signal emitter can be assigned to the household appliance, by way of which the communication and/or control facility of the household appliance can request tariff information from the energy supplier.

The ripple control signal receiver can be positioned for example in the manner of an intermediate adapter on the outside of the household appliance. The intermediate adapter here can be coupled directly into the network connection line of the household appliance.

To match appliance operation further to customer wishes, at least two different types of operation can be assigned by means of the electricity tariff selection facility to each of the electricity tariffs offered. In a first step the user can then select the electricity tariff. In a second step the user can then select an appropriate type of operation, to match appliance operation to the selected electricity tariff.

BRIEF DESCRIPTION OF THE DRAWINGS

An exemplary embodiment of the invention is described below with reference to the accompanying figures, in which.

DETAILED DESCRIPTION OF EXEMPLARY EMBODIMENTS OF THE PRESENT INVENTION

Figure 1:
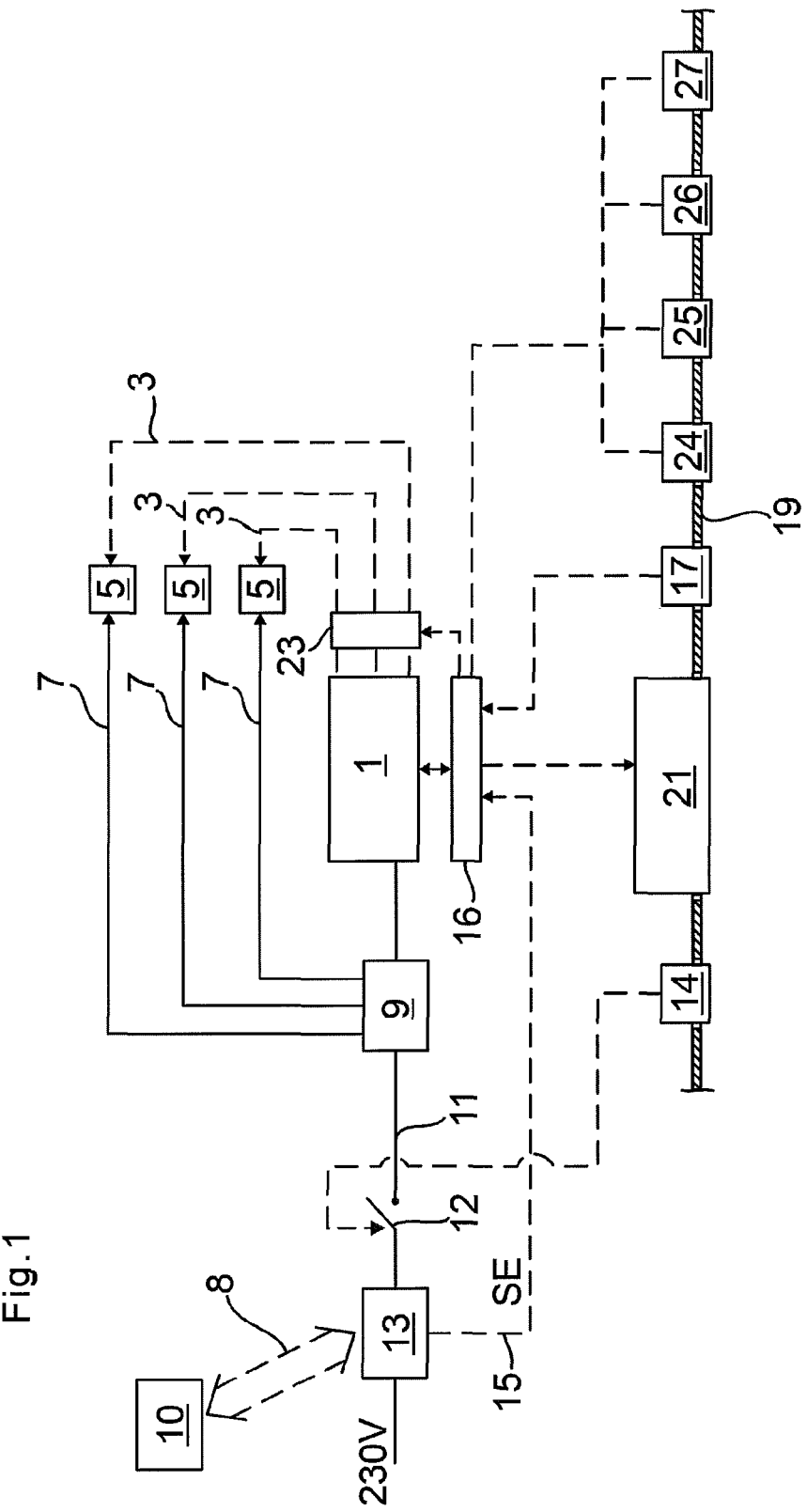
FIG. 1 shows a basic diagram of a highly simplified circuit diagram of a dishwasher.

As shown in FIG. 1, the household appliance, configured in the present exemplary embodiment as a dishwasher, features an electronic communication and/or control facility 1, which actuates different appliance components 5 by way of signal lines 3 shown with broken lines. These may be inter alia a circulating pump, a water heater or a fluid valve. The appliance components 5 and the communication and/or control facility 1 are supplied with low voltage from a network part 9 by way of supply lines 7. Alternatively the appliance components 5 can be supplied with network voltage directly. The network part 9 is in turn connected to the power supply network by way of a network connection line 11.

As also shown in FIG. 1, a main switch 12 and a signal receiver/transmitter 13 are connected in series upstream of the network part 9. The main switch 12 can be actuated by means of a push button 14. The signal receiver/transmitter 13 is connected in a bidirectional signal connection 8 to an energy supplier 10, with the result that network electricity information can be exchanged between the communication and/or control facility 1 and the energy supplier 10 in both directions. For example the signal receiver 13 can derive a control signal SE coming from the energy supplier 10, which is routed by way of the signal connection 15 to an electricity tariff selection facility 16 described below. The bidirectional signal connection 8 allows electricity tariff information to be transmitted from the energy supply company 10 to the electricity tariff selection facility 16. In the reverse direction the communication and/or control facility 1 can request electricity tariffs from the energy supplier 10 by way of the bidirectional signal connection 8.

A user can use the electricity tariff selection facility 16 to select an electricity tariff from the electricity tariffs offered by the energy supplier 10. The electricity price, an availability period and also the manner of electricity generation are generally assigned to each electricity tariff.

For user-friendly selection of the respective electricity tariff the electricity tariff selection facility 16 features a selection knob 17, which together with the push button 14 is disposed in a control panel 19. The electricity tariffs offered by the energy supplier can be listed on a display unit 21 of the electricity tariff selection facility 16, which is likewise disposed in the control panel 19. By actuating the operating knob 17 the user is able to select one of the electricity tariffs listed on the display unit 21.

As also shown in FIG. 1, the selection facility 16 is connected in a signal connection to the communication and/or control facility 1 and to a timer element 23, connected in the signal lines 3 leading to the appliance components 5. The timer element 23 can be used to delay the start of operation by a delay time $\Delta t$ that can be predefined by the communication and/or control facility 1, as shown in the diagram in FIG. 3. At the end of this delay time $\Delta t$ the timer element 23 closes the signal lines to the appliance components 5, thereby enabling the start of operation and allowing the appliance to start operating. The delay time $\Delta t$ is automatically set by the communication and/or control facility 1 so that operation starts at a time when the electricity tariff selected by the user applies.

Figure 2:
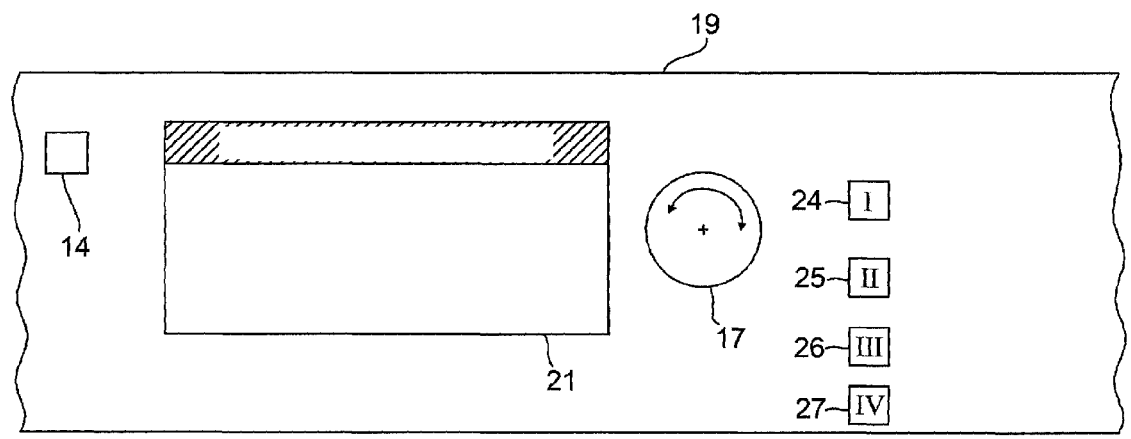
FIG. 2 shows a segment of a control panel of the dishwasher.

FIG. 2 shows a front view of a segment of the control panel 19. According to this the control panel features the push button 14, the display unit 21 and the selection knob 17. This can be rotated to select one of the electricity tariffs 1 to 4 listed on the display unit 21. Immediate appliance operation can optionally also be selected.

On the left side of the control panel 19 in FIG. 2 further selection buttons 24 to 27 are provided, which can be actuated to set different wash program variants. The button I can thus be used to select a short wash time with high energy consumption, the button II can be used to select a long wash time with low energy consumption and the buttons III and IV can be used to select a specific weekend appliance operation or a Monday to Friday appliance operation. The wash program variants offered with the buttons 24 to 27 can be specifically matched to the respective electricity tariffs 1 to 4.

To perform a wash program it is first necessary to press the push button 14, thereby closing the main switch 12 connected in the supply line 11. This causes supply voltage to be present at the appliance components 5 and at the communication and/or control facility 1. The selection knob 17 is then used to select one of the electricity tariffs 1 to 4 from the electricity tariff list on the display unit 21 or even immediate appliance operation.

In FIG. 2 by way of example the electricity tariff 1, i.e. the night electricity tariff, is selected using the selection knob 17. This is shown in FIG. 2 by the hatching behind the text line "at electricity tariff 1—night electricity". In contrast at electricity tariff 2 the energy supplier offers 100% electricity generated by wind power, at electricity tariff 3 100% electricity generated by water power and at electricity tariff 4 100% electricity generated using biogas. Further electricity tariff information, such as electricity price, availability period or the like can also be displayed on the display unit 21.

In a further selection step the user can actuate one of the buttons 24 to 27 to select wash program variants, which are linked to the already set electricity tariff 1.

Figure 3:
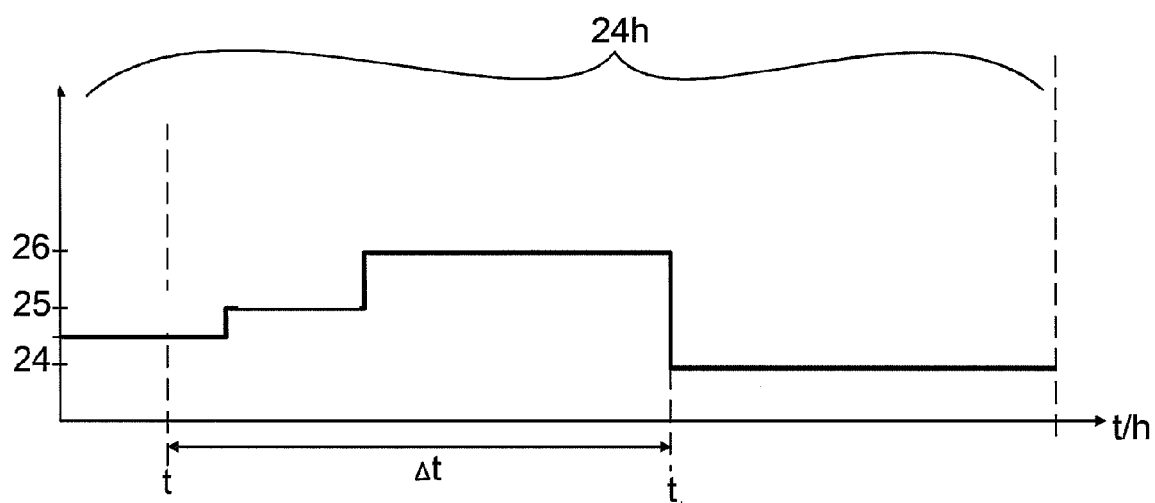
FIG. 3 shows a time diagram of different electricity tariffs offered by the energy supplier.

FIG. 3 shows the electricity tariffs 1 to 4 for example in a time diagram with assigned electricity prices in each instance. According to this the kilowatt hours within the different tariffs 1 to 4 are offered at different electricity prices, varying within a range from 24 to 26 cents. The time diagram shown in FIG. 3 extends by way of example over 24 hours, in which the electricity tariffs 1 to 4 are switched one after the other. Alternatively the electricity tariffs can overlap or their availability times can move about.

According to FIG. 3 the push button 14 is pressed at a time $t_{on}$ and the selection knob 17 is then used to set the night electricity tariff. From these settings the communication and/or control facility 1 calculates the delay time Δt to time $t_{enable}$, when the night electricity tariff 1 applies. The start of operation of the dishwasher is thus delayed automatically by the delay time Δuntil night-time without the user having to set the delay of time Δt manually.

What is claimed is:

1. A household appliance, comprising:
   at least one of a communication and a control facility;
   a bidirectional signal connection connecting the at least one of a communication and a control facility to an energy supplier providing a power supply network to the household appliance, for at least one of exchange and request of information, wherein the household appliance is structured to request the information from the energy supplier and is rendered operative in response to the information requested from the energy supplier; and
   at least one of a signal receiver and a signal emitter,
   wherein the at least one of a communication and a control facility includes an electricity tariff selection facility to enable a user to select an electricity tariff from the electricity tariffs of the energy supplier,
   wherein the at least one of a communication and a control facility is configured to adjust household appliance operation automatically as a function of the selected electricity tariff,
   wherein the at least one of a communication and a control facility is rendered operative automatically in response to the electricity tariffs of the energy supplier to generate a plurality of different wash program types corresponding to the electricity tariffs of the energy supplier, and
   wherein the at least one of a signal receiver and a signal emitter transmits signals between the energy supplier and the electricity tariff selection facility.

2. The household appliance of claim 1, constructed in the form of a water-conducting household appliance.

3. The household appliance of claim 1, wherein the information involves network electricity information relating to the electricity tariffs of the energy supplier.

4. The household appliance of claim 3, wherein the at least one of a communication and a control facility is configured to assign at least two different types of operation to each of the electricity tariffs for a user to select.

5. The household appliance of claim 1, wherein the at least one of a communication and a control facility is rendered operative in response to the information requested from the energy supplier to set a start time.

6. The household appliance of claim 1, wherein the at least one of a communication and a control facility is rendered operative in response to the information requested from the energy supplier to generate a series of at least one of different start times and wash program types, from which the user is able to select at least one of a start time and a wash program type.

7. The household appliance of claim 1, further comprising a timer element operably connected to the at least one of a communication and a control facility and configured to delay a start of operation by a delay time which is predefined by the communication and/or control facility.

8. The household appliance of claim 1,
   wherein the at least one of a signal receiver and a signal emitter transmits signals between the energy supplier and the at least one of a communication and a control facility.

9. The household appliance of claim 1, wherein the at least one of a communication and a control facility includes a display unit to display network electricity information provided by the energy supplier.

10. The household appliance of claim 9, wherein the network electricity information displayed is a time period linked to at least one of a respective electricity tariff, a manner of electricity generation and an electricity price.

11. The household appliance of claim 1,
    wherein the plurality of different wash program types, which are generated by the at least one of a communication and a control facility, varies depending on the electricity tariffs requested from the energy supplier.

12. The household appliance of claim 11, wherein the at least one of a communication and a control facility is configured to assign a plurality of different wash program types to each of the electricity tariffs requested from the energy supplier.

13. A household appliance, comprising:
    at least one of a communication and a control facility;
    a bidirectional signal connection connecting the at least one of a communication and a control facility to an energy supplier providing a power supply network to the household appliance, for exchange and/or request information, wherein the household appliance is structured to request information from the energy supplier and is rendered operative in response to the information requested from the energy supplier; and
    at least one of a signal receiver and a signal emitter,
    wherein the at least one of a communication and a control facility includes an electricity tariff selection facility to enable a user to select an electricity tariff from the electricity tariffs of the energy supplier,
    wherein the at least one of a communication and a control facility is configured to delay a start of operation until a time linked to the selected electricity tariff,
    wherein the at least one of a communication and a control facility is rendered operative in response to the information requested from the energy supplier to generate a plurality of different wash program types corresponding to the electricity tariffs of the energy supplier, and
    wherein the at least one of a signal receiver and a signal emitter transmits signals between the energy supplier and the electricity tariff selection facility.

14. The household appliance of claim 13, further comprising a timer element operably connected to the at least one of a communication and a control facility and configured to delay a start of operation by a delay time which is predefined by the communication and/or control facility.

15. The household appliance of claim 13,
    wherein the at least one of a signal receiver and a signal emitter transmits signals between the energy supplier and the at least one of a communication and a control facility.

16. The household appliance of claim 13, wherein the at least one of a communication and a control facility includes a display unit to display network electricity information provided by the energy supplier.

17. The household appliance of claim 13, constructed in the form of a water-conducting household appliance.

18. A household appliance, comprising:
    at least one of a communication and a control facility configured to control household appliance operation;
    a signal receiver/transmitter configured to provide a bidirectional signal connection connecting the at least one of a communication and a control facility to an energy supplier providing a power supply network to the household appliance, for at least one of exchange and request of information,
    wherein the signal receiver/transmitter transmits signals between the energy supplier and the electricity tariff selection facility,
    wherein the at least one of a communication and a control facility is structured to request the information from the energy supplier and control the household appliance operation in response to the information requested from the energy supplier via the signal receiver/transmitter,
    wherein the information includes network electricity information including electricity tariffs, and
    wherein the at least one of a communication and a control facility includes an electricity tariff selection facility configured to receive the electricity tariffs requested from the energy supplier;
    a display unit in communication with the at least one of a communication and a control facility, the display unit configured to display the information requested from the energy supplier; and
    a control panel having a selection device configured to enable a user to select an electricity tariff from the electricity tariffs requested from the energy supplier,
    wherein the at least one of a communication and a control facility is configured to adjust the household appliance operation automatically as a function of the electricity tariffs requested from the energy supplier,
    wherein the at least one of a communication and a control facility is rendered operative automatically in response to the electricity tariffs of the energy supplier to generate a plurality of different wash program types corresponding to the electricity tariffs of the energy supplier, and
    wherein the selection device is configured to enable the user to select one of the plurality of different wash program types generated by the at least one of a communication and a control facility in response to the electricity tariffs of the energy supplier.

19. The household appliance of claim 18, wherein the at least one of a communication and a control facility is configured to assign a plurality of different wash program types to each of the electricity tariffs requested from the energy supplier.

20. The household appliance of claim 18, wherein the at least one of a communication and a control facility is rendered operative automatically in response to the electricity tariffs of the energy supplier to generate a plurality of different wash program types corresponding to the electricity tariff selected by the user,
    wherein the display unit displays the plurality of different wash program types corresponding to the electricity tariff selected by the user, and
    wherein the plurality of different wash program types, which are generated by the at least one of a communication and a control facility and displayed by the display unit, varies depending on the electricity tariff selected by the user out of the electricity tariffs requested from the energy supplier.

* * * * *